United States Patent [19]

Fikse et al.

[11] 4,238,038
[45] Dec. 9, 1980

[54] LOG YARDING SKYLINE CARRIAGE

[75] Inventors: Tyman H. Fikse; James A. Fikse, 1760 Alki Ave. SW., both of Seattle, Wash.

[73] Assignee: Dana W. Meeks, Sumner, Wash.; by said Tyman H. Fikse

[21] Appl. No.: 949,644

[22] Filed: Oct. 10, 1978

[51] Int. Cl.³ ............................................ B66C 21/00
[52] U.S. Cl. ..................................... 212/89; 104/178
[58] Field of Search ...................... 212/89, 96; 104/178

[56] References Cited

U.S. PATENT DOCUMENTS

| | | | |
|---|---|---|---|
| 3,022,747 | 2/1962 | McIntyre | 104/178 |
| 3,083,839 | 4/1963 | McIntyre | 212/89 X |
| 3,172,544 | 3/1965 | Johnson et al. | 212/89 |
| 3,336,878 | 8/1967 | Malakhoff | 104/178 X |
| 3,407,942 | 10/1968 | McIntyre et al. | 212/89 X |
| 3,776,390 | 12/1973 | Junes et al. | 212/89 X |

*Primary Examiner*—Robert G. Sheridan
*Attorney, Agent, or Firm*—Robert W. Beach; Ward Brown

[57] ABSTRACT

Sheaves mount a carriage on a skyline for yarding logs. A load line having a hooked end hanging from the carriage extends through another sheave on the carriage to a winch on a yarder at one end of the skyline. Brakes actuated by hydraulic cylinders are operable to lock the carriage to the skyline and the load line to the carriage. The skyline brake normally is released and the load line brake normally is set so that hauling in or paying out of the load line by the yarder winch effects movement of the carriage along the skyline. A hooker on the ground actuates setting of the skyline brake and releasing of the load line brake by pressing a button on a radio transmitter which signals mechanism on the carriage to supply hydraulic liquid under pressure from an accumulator to the brake cylinders, and also to a hydraulic motor which drives the load line sheave to lower the load line from the carriage. The hooker receives the load line, hooks a load of logs and signals the yarder operator to haul in the load line to hoist the log load, whereupon the brakes are returned to their normal conditions so that further hauling in of the load line moves the carriage and its log load to the yarder. The accumulator is regenerated to replenish its hydraulic liquid under pressure by a hydraulic pump driven by rotation of the load line sheave as the log load is hoisted and/or by rotation of a skyline sheave as the carriage is moved to the yarder.

21 Claims, 11 Drawing Figures

LOG YARDING SKYLINE CARRIAGE

BACKGROUND OF THE INVENTION

1. Field of the Invention

The present invention relates to log yarding using a load-hoisting carriage traversing a skyline extending over an area from which logs are to be removed.

2. Prior Art

McIntyre U.S. Pat. No. 3,022,747 discloses a "Skyline Yarder With Radio Controls" for downhill logging operations in which a carriage is movable along an inclined skyline by hauling in or paying out a "tow cable" stored on a winch at one end of the skyline and having an end connected to the carriage. A diesel engine is mounted on the carriage for driving a drum containing a "yarding cable" to pay out such cable from the carriage to a hooker on the ground and to haul in such cable to hoist a load of logs hooked by the hooker. Brakes actuated by air cylinders are provided to lock the carriage in a desired position on the skyline and to lock the yarding cable drum after the log load has been hoisted. Radio control mechanism actuates the brake air cylinders, adjusts the speed of the diesel engine and controls the direction of turning of the yarding cable drum.

A problem with the log yarding apparatus of U.S. Pat. No. 3,022,747 is that the skyline must be capable of supporting not only a log load, but also the yarding cable drum, the substantial amount of yarding cable stored on the yarding cable drum, the diesel engine required to turn the drum, a store of fuel for the diesel engine, a storage tank for compressed air for the brake air cylinders and, perhaps, an air compressor. In addition, it often is necessary to refuel the diesel engine and recharge the air storage tank and since the skyline is "at least 40 feet above the ground at all points", access to the engine fuel tank and air storage tank is a problem. Further, complicated clutch mechanism is required so that the engine can drive the yarding cable drum in either direction. Moreover, the radio control mechanism is complicated, including separate controls for actuating the brakes, adjusting the engine speed and actuating turning of the yarding cable drum in either direction. Consequently, the logging apparatus of U.S. Pat. No. 3,022,747 requires frequent maintenance and is heavy, bulky, expensive and difficult to operate.

The "Cable Logging Operation" disclosed in McIntyre U.S. Pat. No. 3,083,839 is similar to the operation disclosed in U.S. Pat. No. 3,022,747, the primary difference being that an "in-haul or snubbing cable" extending from a winch at one end of a skyline and through slack-pulling mechanism on a carriage is substituted for the tow cable and yarding cable of U.S. Pat. No. 3,022,747. The slack-pulling mechanism is operable to pay out from the carriage snubbing cable fed to it by the separate snubbing cable winch on the ground. Such winch, rather than mechanism on the carriage, is used to haul in the snubbing cable to hoist a log road to the carriage.

Similar to the apparatus of patent No. 3,022,747, in the apparatus of patent No. 3,083,839 an internal combustion engine and its fuel tank are mounted on the carriage for powering the slack-pulling mechanism. In addition, air cylinders are provided for actuating brakes for locking the carriage to the skyline and the snubbing cable to the carriage and an air compressor is mounted on the carriage for actuating the brake air cylinders. Further, complicated radio control mechanism is required, including separate controls for actuating each of the brakes and for adjusting the speed of the slack-pulling engine.

Malakhoff U.S. Pat. No. 3,336,878 discloses a "Remote Winch Operated Trolley Hoist" in which a carriage or "trolley" is suspended from a skyline or "high line". A "haul line" extends from a winch at one end of the skyline, around sheaves carried by the carriage and to another stationary winch. A separate hoisting line is carried on a drum on the carriage. Such drum is mechanically driven to pay out and haul in the hoisting line by rotation of the carriage sheaves as the haul line is moved through the carriage. Brakes actuated by hydraulic cylinders are provided to lock the carriage to the skyline and the haul line to the carriage. The brake hydraulic cylinders are powered by hydraulic liquid under pressure stored in an accumulator on the carriage. The accumulator is regenerated by a hydraulic pump driven by movement of the haul line through the carriage.

As with the apparatus of U.S. Pat. No. 3,022,747, a problem with the apparatus of U.S. Pat. No. 3,336,878 is that the skyline must be capable of supporting not only the load hoisted to the carriage, but also the hoisting line drum, the supply of hoisting line stored on the drum and the mechanical drive mechanism for turning the hoisting line drum. In addition, the haul line extends from a winch at one end of the skyline, through the carriage sheave mechanism, through a sheave at the other end of the skyline and back to another winch at the first end of the skyline and, consequently, a long length of haul line and two haul line winches are required.

Other logging systems using carriages mounted on skylines are disclosed in McIntyre et al. U.S. Pat. No. 3,407,942 and Hale et al. U.S. Pat. No. 3,647,255.

SUMMARY OF THE INVENTION

It is an object of the present invention to provide a skyline carriage for moving logs which carriage may be used substantially continuously without requiring frequent maintenance such as refueling.

It is also an object to provide such a carriage using a single load line cable stored other than on the carriage.

An additional object is to provide such a carriage in which lowering of the load line is actuated by remote control, and in which the remote control mechanism has only a single two-position actuating switch so that such remote control mechanism is inexpensive and easy to use.

Another object is to provide such a carriage which is light, compact and includes few component parts.

The foregoing objects can be accomplished by providing a carriage mounted for movement along a skyline and including slack-pulling mechanism utilizing a separate load line which slack-pulling mechanism includes a load line sheave driven by a motor, such as a hydraulic motor, energy-storing mechanism for powering the motor, such as an accumulator for storing hydraulic liquid under pressure, and regenerating mechanism for replenishing the supply of energy stored by the energy-storing mechanism, such as a hydraulic pump driven by movement of the load line relative to the carriage and/or by movement of the carriage along the skyline.

In the preferred embodiment of the invention, the energy-storing mechanism also is used to actuate a skyline brake and a load line brake, and a single remote control switch actuates the energy-storing mechanism to supply energy to the motor and the brakes substantially simultaneously.

DETAILED DESCRIPTION

Figures 1, 2, 3:
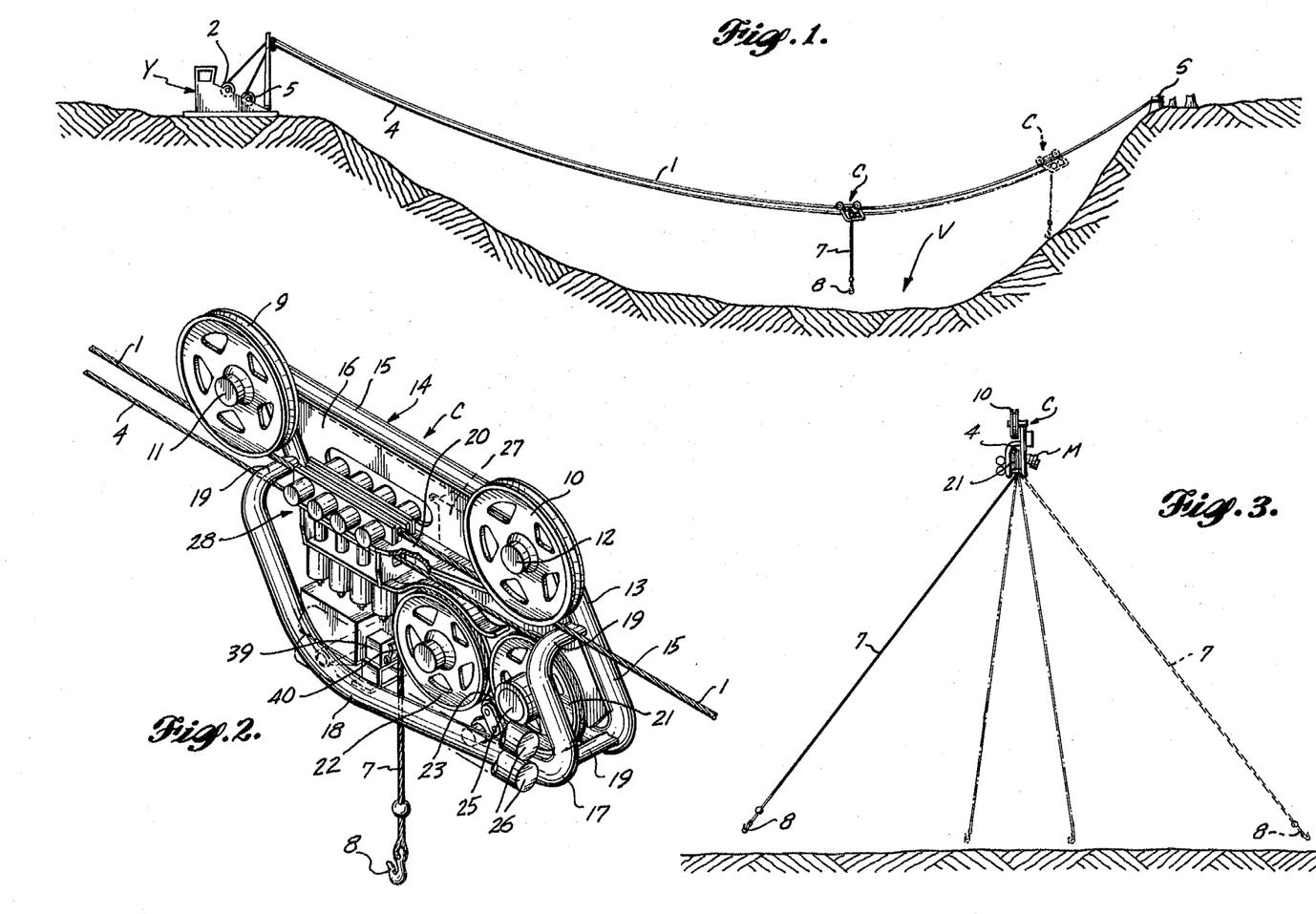
FIG. 1 is a side elevation of log yarding apparatus including a yarder, a skyline, a load line and a carriage in accordance with the present invention.
FIG. 2 is a top perspective of the carriage of FIG. 1, parts being broken away.
FIG. 3 is an end elevation of such carriage on a reduced scale.

As shown in FIG. 1, the present invention is used in a log yarding operation in which a skyline 1 extends over an area from which logs are to be removed, such as a valley V. One end of the skyline is anchored at one side of the area, such as to a stump S, and the other end of the skyline is anchored at the other side of the area, such as to a winch 2 of a yarder Y. A separate load line 4 extends beneath the skyline from another winch 5 on the yarder through a carriage C and includes an end portion 7 hanging from the carriage and carrying a hook 8.

Figure 5:
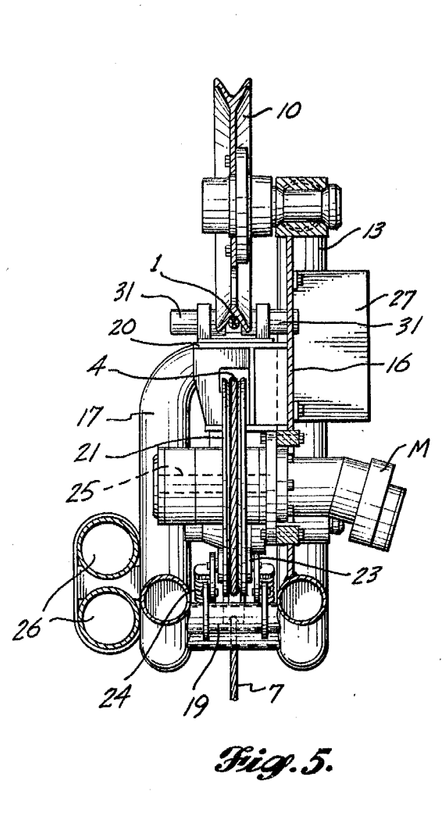
FIG. 5 is a section taken generally along line 5—5 of FIG. 4.
Figure 6:
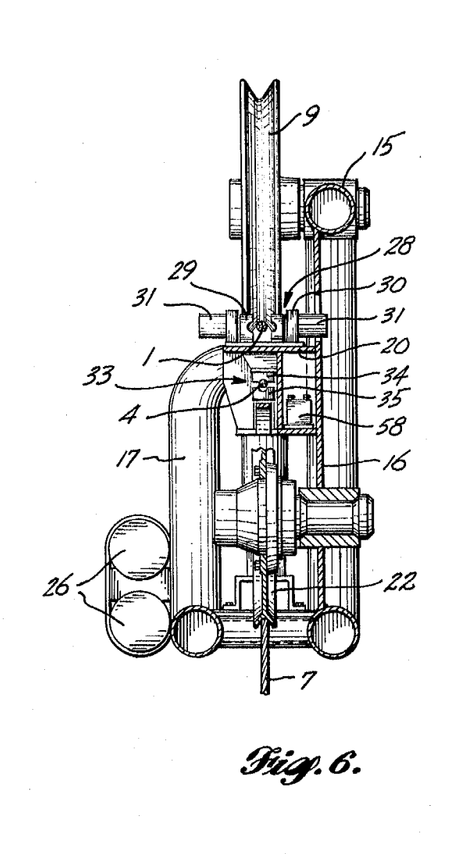
FIG. 6 is a section taken generally along line 6—6 of FIG. 4.
Figure 7:
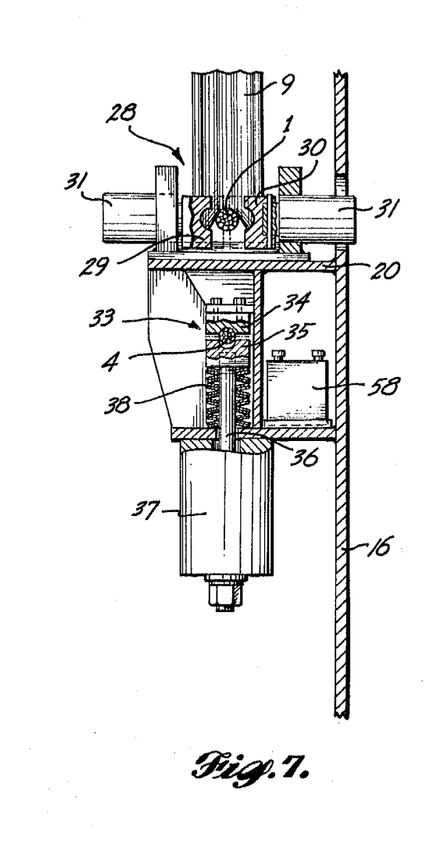
FIG. 7 is an enlarged fragmentary section taken generally along line 7—7 of FIG. 4, parts being broken away.

The carriage is mounted for movement along the skyline by two skyline sheaves 9 and 10 mounted, respectively, at the forward and rear portions of the carriage and rotatable, respectively, about the generally horizontal axes of stub axles 11 and 12. Each stub axle is cantilevered from an upper corner portion of one side 13 of the carriage frame 14. The perimeter of such frame side is formed by rigid tubes 15. An upright mounting plate 16 is shaped complementally to the space between the frame perimetral tubes and has its edges welded to such tubes. The other frame side 17 is formed by a rigid tube 18 secured to frame side 13 by tubular cross members 19. A horizontal mounting plate 20 elongated lengthwise of the skyline has its opposite ends welded to the upper cross members 19 at opposite ends of the carriage so that such plate is positioned directly below the skyline 1, as shown in FIGS. 5, 6 and 7.

Figure 4:
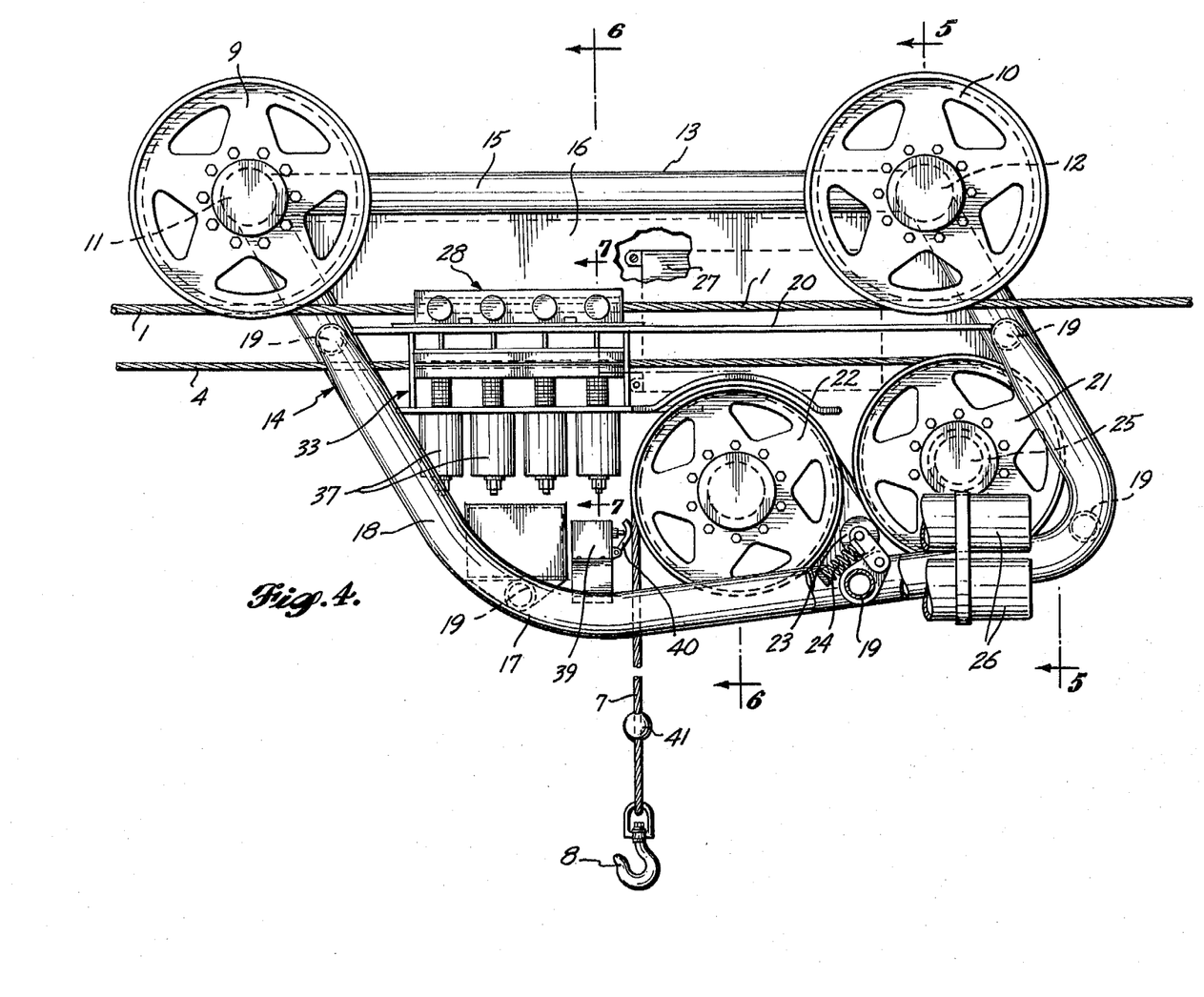
FIG. 4 is an enlarged side elevation of such carriage, parts being broken away.

A load line sheave 21 is mounted at the lower corner portion of the upright mounting plate 16 remote from yarder Y for rotation about a generally horizontal axis, and an idler sheave 22, also rotatable about a generally horizontal axis, is mounted adjacent to sheave 21 nearer the yarder. As best seen in FIG. 4, load line 4 from the yarder load line winch 5 extends generally longitudinally of the carriage between frame sides 13 and 17 directly under the horizontal mounting plate 20, around about 225° of the load line sheave, then around about 135° of the idler sheave if the carriage is level, and its hanging end portion 7 carrying hook 8 hangs vertically downward from the carriage. A roller 23 is pivotally mounted on a frame cross member 19 between the load line and idler sheaves. A compression spring 24 pushes such roller toward the load line sheave to force the load line into the load line sheave groove.

Load line sheave 21 is carried and driven by the output shaft 25 of a hydraulic motor M (see FIG. 5) mounted on the upright mounting plate 16 at the opposite side of such plate from the load line sheave. Such motor is powered by hydraulic liquid under pressure stored in nitrogen charged accumulators 26 which are mounted alongside frame side 17. Such liquid is discharged from the motor to a reservoir 27 which may be mounted on the upright mounting plate 16 above motor M. Although two accumulators are shown, a single high capacity accumulator or several small capacity accumulators could be used.

Brakes are provided for locking the carriage in a desired position along the skyline 1 and for locking the load line in a desired position relative to the carriage. The skyline brake mechanism 28 is secured to the top of the horizontal mounting plate 20 and, as seen in FIGS. 5 and 6, includes calipers having pairs of opposing pads 29 and 30 located at opposite sides of the skyline and spaced lengthwise of the skyline between the two skyline sheaves 9 and 10. Springs (not shown) bias the skyline brake caliper pads away from each other so that the skyline brake normally is released as shown in solid lines in FIG. 7. The opposed pads of such calipers may be forced toward each other to the brake set or actuated position shown in broken lines in FIG. 7 by extension of the plungers of hydraulic cylinders 31 carrying the caliper pads. Such cylinders are powered by hydraulic liquid under pressure from the accumulators 26.

The load line brake mechanism 33 includes a stationary reaction caliper pad 34 carried beneath the horizontal mounting plate 20 directly over the load line and a vertically reciprocable caliper pad 35 carried by the upright plunger 36 of a hydraulic cylinder 37. As best seen in FIG. 7, a stack of Belleville springs 38 biases caliper pad 35 toward caliper pad 34 so that the load line brake normally is set. Such brake is actuated to released condition by retraction of the plunger 36 of hydraulic cylinder 37 which also is powered by hydraulic liquid under pressure from the accumulators 26.

As shown in FIG. 4, a bump valve 39 is mounted adjacent to the forward side of idler sheave 22 so that the bump valve actuating lever 40 rests against a portion of the stretch 7 of load line 4 hanging from the carriage. As described further below, the bump valve is operable by engagement of an enlargement 41, carried by the load line stretch 7 near its free end, with the bump valve actuating lever to discharge hydraulic liquid from the brake cylinders to return the brakes to their normal conditions.

Figure 8:
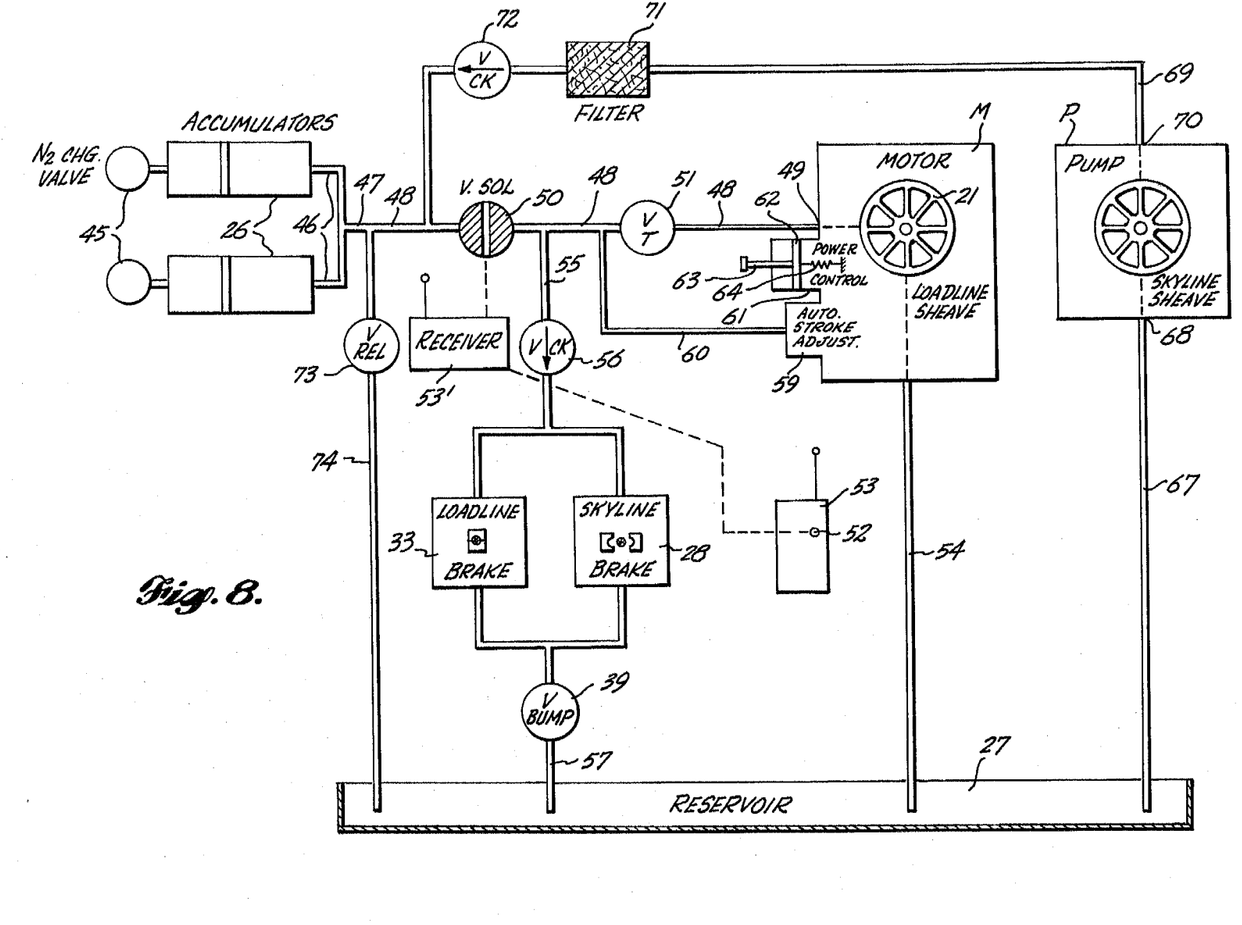
FIG. 8 is a hydraulic circuit diagram of one form of slack-pulling mechanism for a carriage in accordance with the present invention.

As shown diagrammatically in FIG. 8, each accumulator 26 for storing hydraulic liquid under pressure includes a nitrogen charge valve 45. The accumulator outlet conduits 46 are joined by a tee 47 to a single motor supply conduit 48 connected to the inlet 49 of motor M and controlled by a normally closed solenoid valve 50 and a manually adjustable flow control throttle valve 51. The position of the solenoid valve is controlled by the position of a single two-position switch, such as the actuating button 52 of a small radio transmitter 53 which signals a radio receiver 53' mounted on the carriage.

Depressing button 52 effects opening of solenoid valve 50 so that hydraulic liquid under pressure is conveyed from the accumulators to the motor inlet 49, whereupon the motor drives load line sheave 21 to lower load line from the carriage. Such hydraulic liquid is discharged from the motor by a discharge conduit 54 to reservoir 27. Throttle valve 51 controls the rotational speed of the load line sheave and is set so that load line is paid out from the carriage at a desired rate.

Opening of solenoid valve 50 also effects a flow of hydraulic liquid under pressure from the accumulators to each of the hydraulic brake cylinders by way of a brake supply conduit 55 which branches from the motor supply conduit 48 at the discharge side of the control valve 50. Return flow of hydraulic liquid under pressure from the hydraulic brake cylinders through supply line 55 is prevented by a check valve 56. Consequently, the brakes are actuated when valve 50 is opened, but subsequent closing of the valve will not effect return of the brakes to their normal conditions. Such return can be accomplished only by actuation of bump valve 39 to open position which effects discharge of hydraulic liquid from the brake cylinders to the reservoir through a discharge conduit 57.

The radio receiver 53' and solenoid valve 50 are powered by a battery on the carriage, such as battery 58 shown in FIG. 7.

The pressure of the hydraulic liquid supplied to the hydraulic motor from the accumulators 26 depends to a certain degree on how much hydraulic liquid is contained in the accumulators. For example, with the accumulators fully charged, such as when solenoid valve 50 is first opened, the pressure of hydraulic liquid supplied to the motor is higher than after a substantial amount of hydraulic liquid has been supplied to the motor and discharged to reservoir 27. Since the motor power output is a function of the pressure of hydraulic liquid supplied and the flow rate of liquid through the motor, unless mechanism is provided to adjust the flow rate the power output of the motor will decrease as the pressure of the hydraulic liquid supplied decreases.

If the motor is to be capable of pulling a substantial length of slack load line to be lowered from the carriage while it is anchored to the skyline, the motor must develop sufficient power to turn the load line sheave despite the pressure of the hydraulic liquid supplied fluctuating through a considerable range of pressures. Without some type of automatically adjusted flow control mechanism, more power than is required to turn the load line sheave would be developed with high input pressures, such as when the solenoid valve is first opened, in order to ensure that sufficient power would be developed with the lowest expected input pressure, such as after an amount of hydraulic liquid has been supplied to the motor sufficient to lower the load line hook to the ground. Such operation would result in wasting high pressure hydraulic liquid.

The motor shown in FIG. 8 includes a known constant power control or "auto stroke adjust" 59, such as the constant power control of the "A7V Variable Displacement Axial Piston Pump" manufactured by the German corporation Hydromatik GMBH, for automatically adjusting the flow rate of hydraulic driving liquid supplied to a motor in response to a change in the pressure of such hydraulic liquid to maintain a constant power output. As seen in FIG. 8, a small hydraulic liquid pressure-sensing conduit 60 connects the auto stroke adjust to the motor supply conduit 48. As the pressure of the hydraulic liquid supplied from the accumulators 26 to the motor drops, the auto stroke adjust automatically changes the motor swash plate angle to increase the stroke of the motor, which increases the flow rate of hydraulic fluid through the motor.

The level of constant power output maintained can be adjusted manually by a power control 61 shown somewhat diagrammatically in FIG. 8 as including a piston 62 pressed against an adjusting screw 63 by a compression spring 64. The position of piston 62 controls the range of swash plate angles that may be selected by the auto stroke adjust. For example, with the piston 62 in its full-out or left position, effected by unscrewing adjusting screw 63, the minimum swash plate angle will be quite large, resulting in a high constant power output being maintained by the auto stroke adjust. Similarly, with piston 62 in its full-in position, effected by turning adjusting screw 63 to move the piston to the right as shown in FIG. 8 against the force of compression spring 64, the minimum swash plate angle will be quite small and a correspondingly lower constant power output will be maintained by the auto stroke adjust. For any selected adjustment of constant power supply the speed of the motor can be varied by adjustment of throttle valve 51.

Mechanism also is provided for automatically regenerating the accumulators 26 by returning to them an amount of hydraulic liquid equal to that dispensed to drive motor M and operate brakes 28 and 33, and thereby recompress the gas in the accumulators to its initial charged pressure. In the embodiment of FIG. 8 such regenerating mechanism includes a separate hydraulic pump P which, for example, may be mounted adjacent to one of the skyline sheaves 9 or 10 so as to be driven by rotation of such sheave as the carriage is moved along the skyline.

A pump supply conduit 67 conveys hydraulic liquid from reservoir 27 to the pump inlet 68, and a pump discharge conduit 69 conveys such hydraulic liquid from the pump outlet 70 through a filter 71 and a check valve 72 to the motor supply conduit 48 at a location between the accumulators and the solenoid valve 50. A pressure relief valve 73 is connected between the outlet tee 47 for the accumulators and the reservoir 27 by a conduit 74 and automatically discharges hydraulic liquid from the accumulators if the pressure of hydraulic liquid in the accumulators exceeds a predetermined pressure.

The log yarding operation carried out by use of a carriage in accordance with the present invention begins with the carriage located adjacent to yarder Y, the accumulators fully charged, and the brakes in their normal conditions, that is, with the skyline brake released and the load line brake set. The yarder operator pays out load line from the yarder winch 5 and the gravitational pull on carriage C causes the carriage to move downward along the skyline.

When the carriage has reached a desired position, a hooker on the ground depresses the actuating button 52 of radio transmitter 53 which, as described above, signals the carriage radio receiver 53' to open solenoid valve 50. Hydraulic liquid under pressure is quickly supplied to the carriage brake cylinders to actuate the brakes. Substantially simultaneously, hydraulic liquid under pressure is supplied to motor M which drives the load line sheave 21 to pull slack load line from the yarder and pay out load line from the carriage. During this part of the operation, the yarder operator releases slack to the carriage as is required, visually gauging the amount of slack in the load line stretch extending from yarder winch 5 to the carriage. The hooker has complete control over the amount of load line paid out from the carriage by depressing and releasing the radio transmitter actuating button without fear of releasing the skyline brake or setting the load line brake.

The hooker receives the end of the load line carrying hook 8 and hooks a load of logs. The hooker can travel a substantial distance fore or aft or, as seen in FIG. 3, laterally of the carriage to displace the hook from a location directly beneath the carriage.

After the log load has been hooked, the hooker signals the yarder operator, such as by walkie-talkie, to haul in the load line. Hauling in of the load line drives the load line sheave 21 and the idler sheave 22 in reverse as the log load is hoisted to the carriage. As such load nears the carriage, the load line enlargement 41 adjacent to hook 8 engages the actuating lever 40 of bump valve 39 to open it for discharge of hydraulic liquid from the carriage brake cylinders, which sets the load line brake and releases the skyline brake. Further hauling in of the load line moves the freed carriage along the skyline toward the yarder. In the embodiment of the present invention shown in FIG. 8, such movement of the carriage along the skyline drives pump P to regenerate the accumulators.

Figure 9:
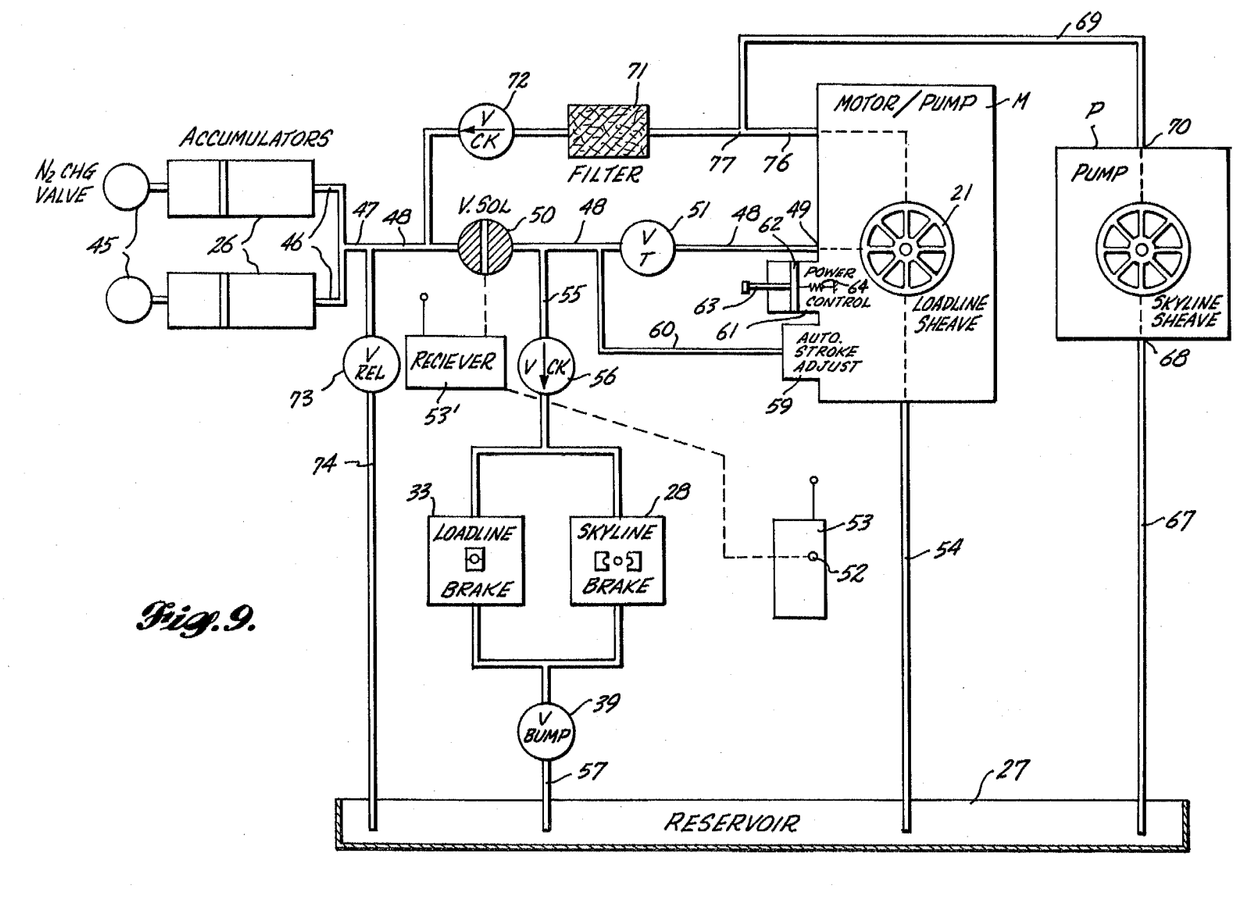
FIG. 9 is a hydraulic circuit diagram of an alternative form of slack-pulling mechanism for a carriage in accordance with the present invention.

The alternative embodiment of the present invention shown diagrammatically in FIG. 9 is almost the same as the embodiment of FIG. 8, the only difference being that motor M, such as the Hydromatik GMBH A7V, is connected to operate not only as a motor to drive the load line sheave when hydraulic liquid under pressure from the accumulators 26 is supplied to its inlet 49, but also as a pump to regenerate the accumulators when solenoid valve 50 is closed and the load line sheave is driven in reverse when the load line is being hauled in by yarder winch 5 to hoist a log load to the carriage.

The outlet 70 of pump P still is connected to the accumulators by a conduit 69, and the outlet conduit 76 of motor M for supplying regenerating hydraulic liquid to the accumulators is joined to conduit 69 by a tee 77. Consequently, hydraulic liquid under pressure for regenerating the accumulators is supplied both by motor M as the load line sheave is driven in reverse and by pump P as one of the skyline sheaves is rotated by movement of the carriage along the skyline.

The log yarding operation effected by use of the carriage of FIG. 9 is substantially identical to the operation effected by use of the carriage of FIG. 8.

Figure 10:
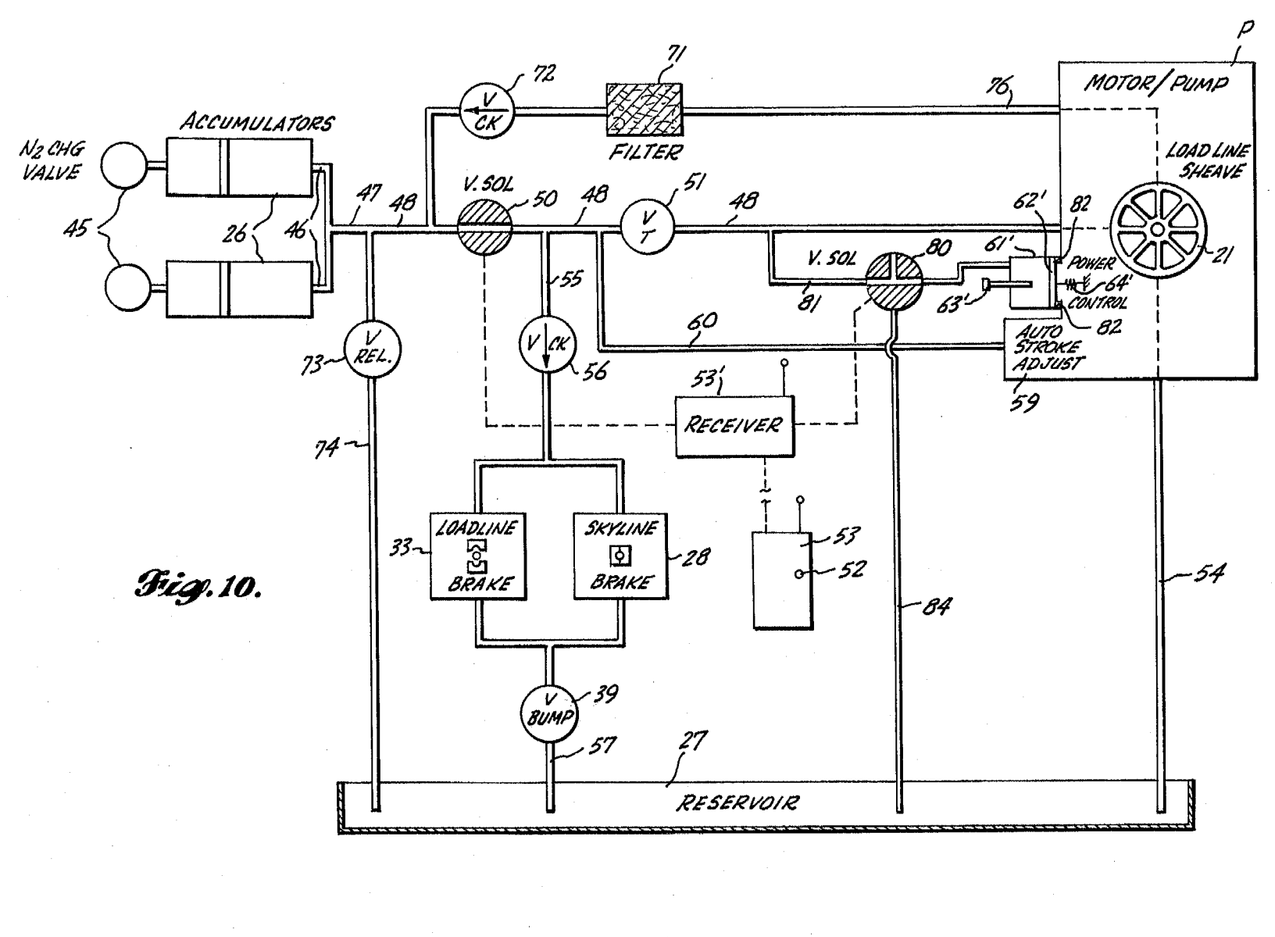
FIG. 10 is a hydraulic circuit diagram of the preferred form of slack-pulling mechanism for a carriage in accordance with the present invention.
Figure 11:
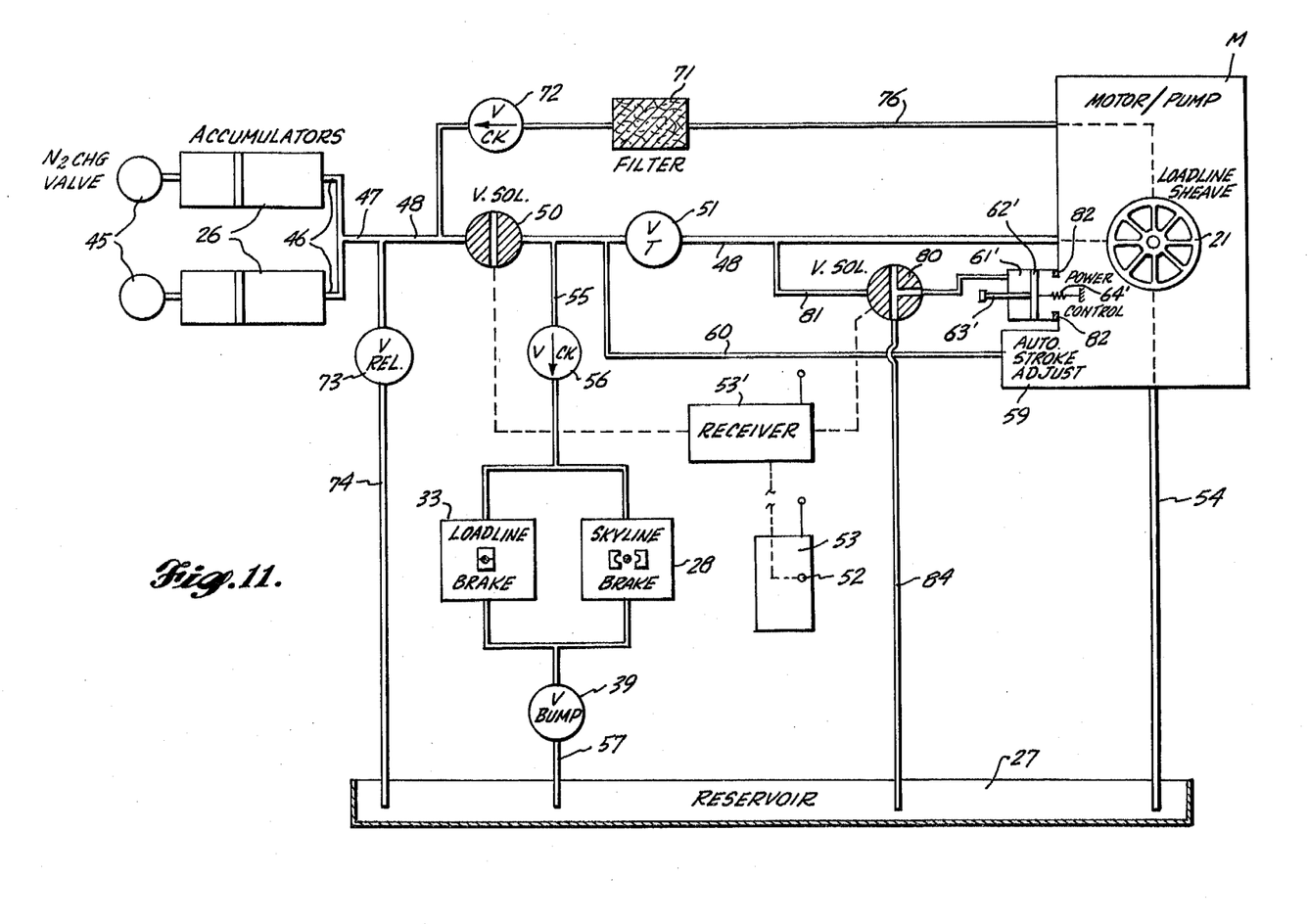
FIG. 11 is a corresponding diagram with parts in different positions.

The preferred embodiment of a carriage in accordance with the present invention is shown diagrammatically in FIGS. 10 and 11. As in the previously described embodiments, the outlet conduits 46 of accumulators 26 having nitrogen charge valves 45 are joined by a tee 47 to a single motor supply conduit 48. Such conduit is connected to the inlet 49 of motor M controlled by a solenoid valve 50 and a manually adjustable flow control throttle valve 51. The brake supply conduit 55 branches from motor supply conduit 48, and a check valve 56 prevents return flow of hydraulic liquid supplied to the brake cylinders. Once actuated, the brakes can be returned to their normal conditions only by actuation of a bump valve 39 which controls discharge of hydraulic liquid from the brake cylinders to reservoir 27 through a discharge conduit 57.

Hydraulic liquid supplied to the motor to drive the load line sheave is discharged to the reservoir through a motor discharge conduit 54. A small hydraulic liquid pressure-sensing conduit 60 branches from the motor supply conduit 48 and is connected to the auto stroke adjust of the motor, which may be the Hydromatik A7V, and adjusts the motor swash plate angle to maintain a constant power output for a range of pressures of hydraulic liquid supplied to the motor.

A major difference between the embodiment of FIGS. 10 and 11 and the previously described embodiments is that in the embodiment of FIGS. 10 and 11 no separate pump for regenerating the accumulators 26 is provided. Regeneration of the accumulators is accomplished solely by motor M while the load line sheave is being driven in reverse which effects a flow of hydraulic liquid from the motor to the accumulators through the motor outlet conduit 76 by way of filter 71 and check valve 72. However, no hydraulic motor is 100% efficient and, if the power setting of the motor remained constant, after an amount of hydraulic liquid under pressure from the accumulators sufficient to drive the load line sheave a desired number of revolutions had been discharged, the accumulators would not be completely regenerated by driving the load line sheave in reverse the same number of revolutions. Consequently, in the preferred embodiment of the invention the motor power control is modified so that it automatically adjusts the power output of motor M in accordance with whether it is acting as a motor to drive the load line sheave or as a pump to regenerate the accumulators.

The modified power control 61' includes a piston 62' normally biased against an adjusting screw 63' by a compression spring 64'. However, when the actuating button 52 of the radio transmitter 53 is depressed, the carriage-mounted radio receiver 53' not only actuates opening of solenoid valve 50 to supply hydraulic liquid under pressure to the brakes and to the motor inlet 49, but also actuates opening of a two-way valve 80 to the position shown in FIG. 10 in which hydraulic liquid under pressure is supplied through a small conduit 81 branching from the motor supply conduit 48 to the modified power control mechanism.

As shown in FIG. 10, hydraulic liquid under pressure supplied to the modified power control mechanism forces piston 62' against stops 82, moving it to the right as shown in FIG. 10 against the force of compression spring 64', and automatically sets motor M at a low power setting just sufficient to drive the load line sheave to lower the load line from the carriage.

When the radio transmitter actuating button is released, such as when it is time for the yarder operator to haul in the load line to hoist a log load hooked by the hooker to the carriage, solenoid valve 50 returns to its normally closed position to cut off the supply of hydraulic liquid to the brakes and the motor, and the three way solenoid valve 80 is moved to the position of FIG. 11 in which hydraulic liquid under pressure in the modified power control mechanism is vented to reservoir 27 through a small discharge conduit 84. The force of compression spring 64' moves piston 62' away from stops 82, to the left as shown in FIG. 11, up against adjusting screw 63' which sets the motor at a high power range. At this setting the swash plate angle and the motor stroke are increased so that when the load line sheave is driven in reverse by the hoisting of the log load, a larger amount of liquid will be pumped to the accumulators than was discharged from the accumulators to drive the load line sheave. When the gas pressure of the accumulators is restored and the pressure of hydraulic liquid in the accumulators exceeds the pressure necessary to actuate opening of the pressure relief valve 73, excess hydraulic liquid pumped toward the accumulators by motor M passes through conduit 74 to the reservoir rather than to the accumulators. Thus, the accumulators will be fully charged after each load line lowering and log load hoisting operation.

I claim:

1. For use in apparatus including a skyline; a carriage carrying skyline sheave means mounting the carriage for movement along the skyline and load line sheave means for receiving a load line; and slack-pulling means carried by the carriage for driving the load line sheave means to lower load line from the carriage; the improvement comprising the slack-pulling means including an accumulator, a hydraulic motor powered by said accumulator for driving the load line sheave means, a hydraulic pump for replenishing the supply of liquid stored by said accumulator, and valve means for selectively supplying liquid under pressure from said accumulator to said hydraulic motor, said motor, said accumulator, said pump and said valve means being mounted for movement with the carriage along the skyline.

2. In the apparatus defined in claim 1, the pump being driven by rotation of at least one of the sheave means.

3. In the apparatus defined in claim 2, the pump being driven by rotation of the load line sheave means.

4. In the apparatus defined in claim 2 or 3, the pump being driven by rotation of the skyline sheave means.

5. In apparatus including a skyline; a carriage carrying skyline sheave means mounting the carriage for movement along the skyline and load line sheave means for receiving a load line; and slack-pulling means carried by the carriage for driving the load line sheave means to lower load line from the carriage, the improvement comprising the slack-pulling means including an accumulator and a hydraulic device adapted to be powered by said accumulator to operate as a motor for selectively driving the load line sheave means and adapted to be driven by the load line to operate as a pump for replenishing said accumulator with liquid, said hydraulic device and said accumulator being mounted for movement with the carriage along the skyline.

6. In the apparatus defined in claim 1 or 5, a skyline brake for holding the carriage in a position fixed relative to the skyline, and means powered by the accumulator for actuating said skyline brake.

7. In the apparatus defined in claim 1 or 5, a load line brake for holding the load line in a desired position relative to the carriage, and means powered by the accumulator for actuating said load line brake.

8. In the apparatus defined in claim 5, valve means for selectively supplying liquid under pressure from the accumulator to the hydraulic device.

9. Apparatus comprising:
a yarder;
a skyline extending from said yarder;
a load line extending from said yarder alongside said skyline;
a carriage;
skyline sheave means mounting said carriage for movement along said skyline;
load line sheave means carried by said carriage for receiving said load line from said yarder;
skyline brake means normally released for movement of said carriage along said skyline and actuatable to lock said carriage in a desired position on said skyline;
load line brake means normally set for locking said load line in a desired position relative to said carriage and actuatable for movement of said load line relative to said carriage;
winch means on said yarder for paying out and hauling in said load line for moving said carriage along said skyline when said skyline brake means and said load line brake means are in their normal conditions and for feeding said load line to and drawing said load line from said carriage when said skyline brake means and said load line brake means are actuated; and
slack-pulling means mounted for movement along said skyline with said carriage, said slack-pulling means including an accumulator, a hydraulic motor, powered by said accumulator and remotely and intermittently energizable for driving said load line sheave means to pull slack from said winch means and to lower said load line from said carriage, and a hydraulic pump for replenishing said accumulator with liquid.

10. The apparatus defined in claim 9, and remote control valve means for selectively controlling the supply of liquid under pressure from the accumulator to the hydraulic motor.

11. The apparatus defined in claim 10, each of the brake means including hydraulic cylinder means powered by liquid under pressure from the accumulator for actuating the brake means.

12. The apparatus defined in claim 9, including common supply valve means for selectively supplying liquid under pressure from the accumulator simultaneously to the hydraulic motor and each of the brake means.

13. The apparatus defined in claim 12, including check valve means for maintaining the liquid pressure to each of the brake means when the liquid to the hydraulic motor is discharged.

14. The apparatus defined in claim 11 or 13, and means for discharging liquid under pressure from the brake means to return them to their normal conditions automatically when the load line is in a predetermined position relative to the carraige.

15. The apparatus defined in claim 11, the remote control valve means including means for selectively supplying liquid under pressure from the accumulator to the hydraulic cylinder means.

16. The apparatus defined in claim 15, the remote control valve means including a radio receiver carried by the carriage and a radio transmitter having switch means for energizing said radio receiver to effect actuation of the brake means and powering of the hydraulic motor.

17. The apparatus defined in claim 16, the switch means being a single two-position switch for controlling the supply of liquid under pressure from the accumulator to the hydraulic motor and the hydraulic cylinder means in one position and for cutting off such supply in its other position.

18. For use in apparatus including a skyline; a carriage carrying skyline sheave means mounting the carriage for movement along the skyline and load line sheave means for receiving a load line; and slack-pulling means carried by the carriage for driving the load line sheave means to lower load line from the carriage, the improvement comprising the slack-pulling means including an accumulator, a hydraulic motor powered by said hydraulic accumulator for selectively driving said load line sheave means, regenerating means for replenishing said accumulator with liquid, and power control means for automatically setting said hydraulic motor at one power setting when it is being powered by liquid under pressure and for automatically setting said hydraulic motor at another power setting when it is not being powered by liquid under pressure, said hydraulic motor, said accumulator and said power control means being mounted for movement with the carriage along the skyline.

19. The apparatus defined in claim 18, the power control means including a piston movable by liquid under pressure from the accumulator.

20. The apparatus defined in claim 19, and remote control valve means including a first valve for controlling the supply of liquid under pressure to the hydraulic motor and a second valve for controlling the supply of liquid under pressure to the power control means to move its piston.

21. The apparatus defined in claim 20, the second valve being a two-way valve for effecting supply of liquid under pressure from the accumulator to the power control means in one position and for effecting discharge of liquid under pressure from the power control means in a second position.

* * * * *